(12) United States Patent
Joslin et al.

(10) Patent No.: US 6,374,249 B1
(45) Date of Patent: Apr. 16, 2002

(54) DATA STRUCTURE AND OPERATIONS FOR TIME-VARYING VARIABLE IN AN ENTERPRISE MODEL

(75) Inventors: David E. Joslin, Seattle, WA (US); Laerte F. Morgado, Taguatinga (BR)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/371,821

(22) Filed: Aug. 11, 1999

Related U.S. Application Data

(60) Provisional application No. 60/096,089, filed on Aug. 11, 1998.

(51) Int. Cl.[7] .............................. G06F 17/00; G06F 7/00
(52) U.S. Cl. ........................................................ 707/100
(58) Field of Search ................... 707/100, 104, 707/203

(56) References Cited

U.S. PATENT DOCUMENTS

| | | | |
|---|---|---|---|
| 5,434,775 A | | 7/1995 | Sims et al. ................. 364/403 |
| 5,778,223 A | * | 7/1998 | Velissaropoulos et al. .. 395/611 |
| 5,778,370 A | * | 7/1998 | Emerson ..................... 707/100 |
| 5,787,274 A | * | 7/1998 | Agrawal et al. ............ 395/613 |
| 5,787,430 A | * | 7/1998 | Doeringer et al. .......... 707/100 |
| 5,884,300 A | | 3/1999 | Brockman ..................... 707/2 |
| 5,890,166 A | * | 3/1999 | Eisenberg et al. .......... 707/203 |
| 5,893,100 A | * | 4/1999 | Chui et al. .................. 707/100 |
| 6,003,033 A | * | 12/1999 | Amano et al. .............. 707/100 |
| 6,006,196 A | | 12/1999 | Feigin et al. ................ 705/10 |
| 6,052,688 A | * | 4/2000 | Thorsen ...................... 707/100 |
| 6,081,814 A | * | 6/2000 | Mangat et al. .............. 707/501 |
| 6,115,716 A | * | 9/2000 | Tikkanen .................... 707/100 |
| 6,289,349 B1 | * | 9/2001 | Woodrum .................... 707/100 |
| 6,292,797 B1 | * | 9/2001 | Tuzhilin et al. ................ 707/6 |
| 6,292,810 B1 | * | 9/2001 | Richards ..................... 707/503 |

FOREIGN PATENT DOCUMENTS

JP  11203372 A  7/1999

OTHER PUBLICATIONS

E. Mäkinen, "A Survey on Binary Tree Codings", The Computer Journal, vol. 34, No. 5, pp. 438–443, 1991.
Fenner, et al. "A Study of Binary Tree Traversal Algorithms and a Tag–free Threaded Representation", International Journal of Computer Mathematics, vol. 20, pp. 171–185, 1986.
PCT International Preliminary Examination Report, Aug. 9, 2000.
Jie et al. "A Translation–invarian Wavelet Representation Algorithm and Applications," *IEEE Transactions on Signal Processing*, vol. 44, issue 2, pp. 225–232, Feb. 1996.

* cited by examiner

*Primary Examiner*—Jack Choules
*Assistant Examiner*—Linh M Pham
(74) *Attorney, Agent, or Firm*—Baker Botts L.L.P.

(57) ABSTRACT

A method of using a binary tree data structure to represent a time-varying variable, and to solve queries about the variable. The tree is especially useful for solving "find" type queries, such as "What is the earliest/latest time when a minimum of y units are on hand?" This type of query can be solved with a efficiency of O(log n), where n is the number of nodes of the tree.

14 Claims, 2 Drawing Sheets

DATA STRUCTURE AND OPERATIONS FOR TIME-VARYING VARIABLE IN AN ENTERPRISE MODEL

RELATED PATENT APPLICATION

This application claims the benefit of U.S. Provisional Application No. 60/096,089, filed Aug. 11, 1998 and entitled "Data Structure and Operations for Time-Varying Variable in an Enterprise Model".

TECHNICAL FIELD OF THE INVENTION

This invention relates to computer data structures and algorithms, and more particularly to a data structure for representing a time-varying variable and to algorithms that use the data structure.

BACKGROUND OF THE INVENTION

As applications for computer software get increasingly complex and sophisticated, so does the need for efficiency in performance of the software. An example of complex software is the "enterprise" software being used to model the operation of businesses, such as manufacturers or service providers.

An enterprise model typically models time-varying quantities, such as inventory. The enterprise model often further models scheduling type processes, where resources and their availability are represented.

Enterprise software typically permits the user to enter queries about time-varying quantities. Sometimes the query might be a simple "function value" type of query, such as, "How many on hand at time t?". However, a more practical "find" type of query asks for earliest/latest or maximum/minimum information. For example, a query seeking both "earliest" time and "minimum" amount information might ask, "Find the earliest time greater than t at which we will have a minimum of n units of material on hand?". In this example, t is the earliest time at which a task might be scheduled (due to other constraints) and n is the number of units of material that the task will consume.

One approach to solving queries involving time-varying variables is to represent values of the variable with a "binary tree". A binary tree is a type of data structure known in the art of algorithms, which arranges data hierarchically. The tree may be queried to obtain data about the variable.

One commercially available enterprise model, manufactured by Optimax Corporation under the trademark OPTIFLEX, used a binary tree to represent a time varying function. At each node, certain values relative to the "sub-tree" of that node were stored.

SUMMARY OF THE INVENTION

One aspect of the invention is a method of storing values of a time-varying variable. The variable is represented as a time-varying function having time values and function values. The time-varying function is then represented as a binary tree, each node of the tree associated with a change in value of the function. The tree is balanced such that each child node having a value less than that of its parent node is to the left of the parent node and each child node having a time value greater than that of its parent node is to the right of the parent node. The stored values at each node are a time value, a delta value, a maximum subtree value, and a minimum subtree value. The latter two "subtree values" are referred to as such because they represent a relative contribution from the subtree beginning with that node. The tree has an associated bounding box function callable from any node, which is operable to use that node's subtree values to calculate one or more bounds of values of the function within the subtree. These bounds may be time bounds or quantity bounds.

An advantage of the invention is that the tree provides solutions to "earliest" and "latest" type queries. Morever, these queries may specify time limits, such as "earliest after time t" or "latest before time t".

DETAILED DESCRIPTION OF THE INVENTION

Binary Tree Structure

Figure 1:
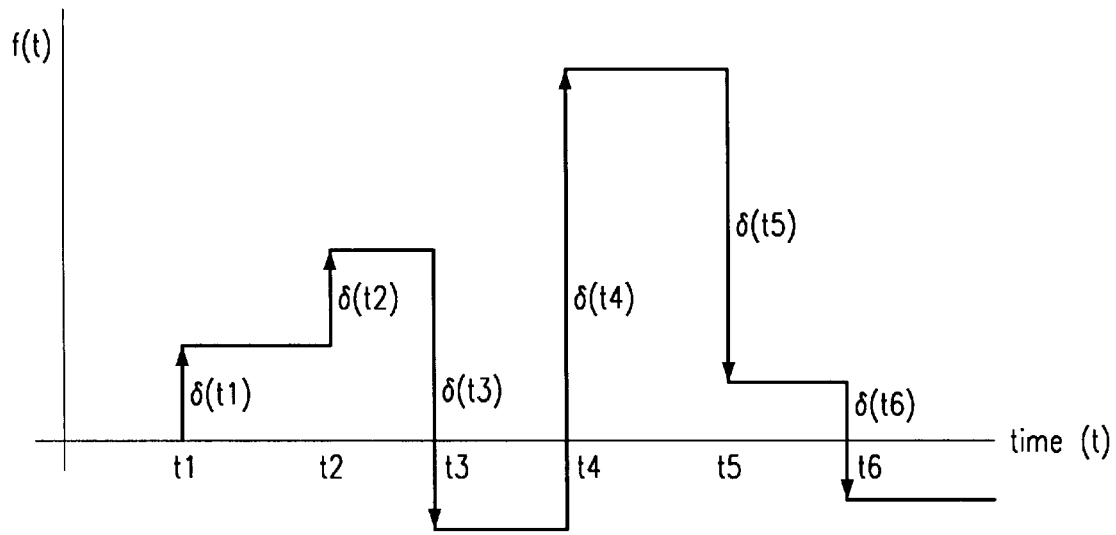
FIG. 1 is an example of a time-varying function, to be represented with a binary tree data structure in accordance with the invention.

FIG. 1 illustrates a time varying function, f(t), which is to be represented as a data structure in accordance with the invention. The function can be expressed as a set, S, of ordered pairs, $S=(X_i, \delta(X_i))=\{(t_1, \delta(t_1)), (t_2, \delta(t_2)), \ldots (t_n, \delta(t_n))\}$. The value of f(t) at any time T is $f(T)=\delta(X_1)+\delta(X_2)+\ldots+\delta(X_n)$, with $n \leq t$. A function represented in this manner is sometime referred to as a "fluent" function.

Expressed less formally, f(t) can be expressed as a sequence of delta ($\delta$) values in increasing order of time. It is assumed that the initial value of F(t) is 0. It is further assumed that the values of t and $\delta$ are real values, and can be integer values. The value of f(t) at a particular time, T, is computed by adding all the delta values that come before that time.

In practical application, f(t) might be an amount of inventory. Over time, this amount changes, giving rise to delta values, as inventory is shipped out and replenished. Throughout the operation of an ongoing enterprise, new deltas (plus or minus) are continually being added to the function.

Meanwhile, queries about the amount of inventory are being made. As described in the Background, there might be a need to know f(t) at a specified time t. Or, a more sophisticated query might ask for a time at which at least a specified value of f(t) will be available, i.e., an amount $\geq Y$.

Figure 2:
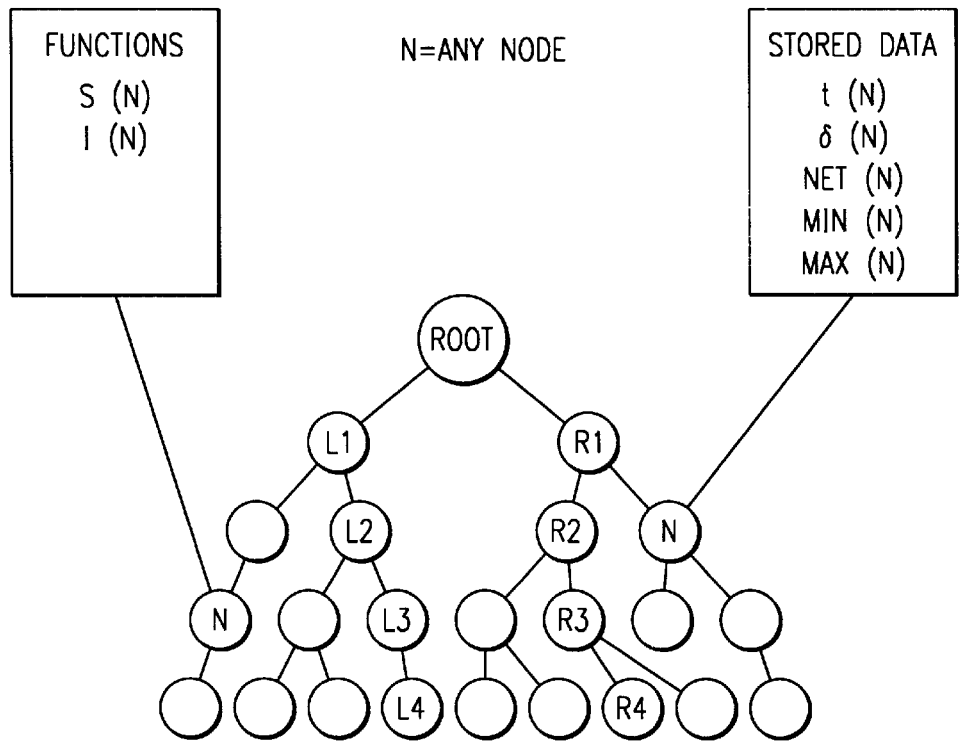
FIG. 2 illustrates the binary tree structure of the invention, as well as data stored at each node.

FIG. 2 illustrates the binary tree structure of the present invention, as well as the data stored at each node and the functions that may be called at a node.

Each node, N, stores the following values: t(N), $\delta$(N), Net(N), Min(N), and Max(N). Each node of the tree corresponds to a member of the set S described above in connection with FIG. 1. Thus, at any node, the stored values t and $\delta$ are an ordered pair associated with f(t). The other stored values, as well as the functions I(N) and S(N), are explained below. The stored data and functions are used during traversal of tree to solve queries to the tree.

The tree is balanced, in that the root node divides the members of f(t) in half. In other words, half the members of f(t) are to the left of R and half are to the right (within a margin of one to cover the case of an even number of nodes).

Thus, for example, if f(t) has n+1 members, n/2 members are to the left of the root node and n/2 members are to the right of the root node. As new deltas occur and f(t) acquires new members, new nodes are added. The tree is re-balanced when appropriate, which causes the values stored in the root node to change. A special case is when the new node has a value of t that is the same as an existing node, in which case the values stored in the node are updated.

Each node has an associated time span that is determined by its position in the tree. The root of the tree, at node R, corresponds to the entire time span of f(t), i.e., the "root time span", which is from $-\infty$ to $+\infty$. Thus, for the root node, $-\infty > t < +\infty$. The root node partitions this time span into two parts, one associated with the subtree to the left of R and one associated with the subtree to the right of R. Likewise, each node under the root node partitions its associated time span into two parts. Thus, going down the tree, the nodes' subtrees represent smaller subdivisions of the root time span. Leaf nodes, such as nodes L4 and R4, have no subtree.

The interval function I(N) defines which nodes are in the subtree. In general, the interval, I(N), for any node is the interval from the leftmost node to the rightmost node in the subtree beginning at N.

As stated above, each node N stores the following associated values:

t(N)=time at which a delta occurs
$\delta$(N)=value of delta at t
Net(N)=sum of deltas in the subtree
Max(N)=maximum cumulative change in the subtree
Min(N)=minimum cumulative change in the subtree The latter three values are calculated from values of members of node N's subtree.

Net (N), defined above as the sum of deltas in the subtree (which includes the delta of the node itself), can be calculated as the difference between the function value immediately after the last delta in the subtree and the function value immediately before the first delta. In other words, the net value is determined from a "start value", S(N), and "end value", E(N), associated with the subtree of any node, N. The "start value" for a node is the value of f(t) immediately before the earliest (left-most) delta in the node's subtree. The "end value" is the value immediately after the last (right most) delta in the node's subtree. The end value is also the start value plus the net value, or E(N)=S(N)+Net(N).

For the root node, the start value is zero, or S(N)=0. At all times after the last delta, the value of f(t) is the net value of the root, Net(R). This is because at the root, the end value is the same as the last value and the start value is zero. For a leaf node, the net value is the same as the delta value, or Net(N)=$\delta$(N).

The start value and end values, S(N) and E(N), are not stored. However, as the tree is traversed from the root node to a leaf node, S(N) can be calculated at each node. If N is a parent node, and L and R are its left and right children, then S(L)=S(N) because they have the same leftmost delta. The value of S(R) can be can determined from known and stored values: S(R)=S(N)+Net(L)+$\delta$(N).

Min(N) is the lowest function value relative to S(N), achieved at any point in the node's subtree. In other words, the lowest function value reached in the time interval associated with a node N is S(N)+Min(N). Min(N) does not represent a "weak" lower bound—the value of f(t) is guaranteed to reach S(N)+Min(N) in the time interval. Max(N) is like Min(N), except that it is the highest function value reached relative to S(N).

If the node is a leaf node, Min(N) is the minimum of zero and $\delta$(N). This is because if $\delta$(N) is positive, the lowest value is S(N), which is the value before t(N). Similarly, for a leaf node, Max(N) is the maximum of zero and $\delta$(N).

For any non-leaf node N, with left and right children L and R:

Net(N)=Net(L)+Net(R)+$\delta$(N)
Min(N)=minimum of Min(L) and (Net(L)+$\delta$(N)+Min(R))
Max(N)=maximum of Max(L) and (Net(L)+$\delta$(N)+Max(R)). The calculation of Min(N) can be explained as follows. As stated above, S(N)=S(L) and S(R)=S(L)+Net(L)+$\delta$(N). Because Min(R) is relative to S(R) but Min(N) is relative to S(N), it is adjusted by S(R)-S(N) to determine whether the minimum value reached under R is the minimum value reached under N. S(R)-S(N)=Net(L)+$\delta$(N). Thus, the calculation of Min(N) considers at the minimum value reached under each child's subtree, with the right-hand subtree minimum adjusted for the difference in start values.

A feature of the data stored in a node is that it is local to the node's subtree. The data does not depend on values before or after the time interval associated with the node. Each node stores "subtree values", (Net(N), Min(N), or Max(N)), each which represents a relative contribution of the subtree to a function value.

As explained below, when the tree is traversed for solving a query, these relative subtree values are used to calculate absolute values from which function values are determined. More specifically, the Net(N) subtree value is the basis for calculating the function value at that node. The Min(N) and Max(N) subtree values are the basis for calculating maximum and minimum bounds of function values within the subtree.

Example of f(t)

Figure 3:
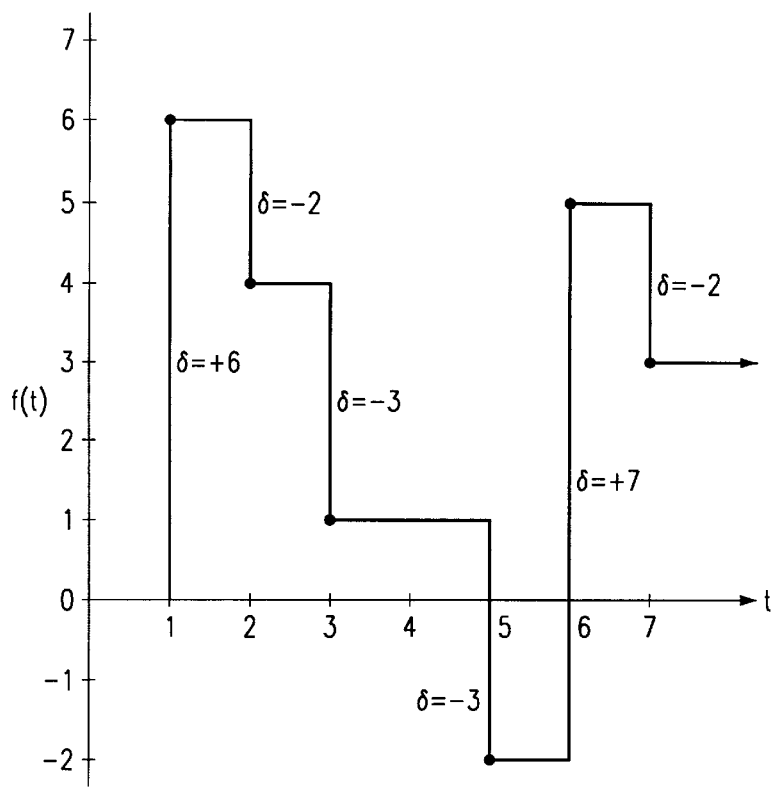
FIG. 3 illustrates an example of a particular time-varying function.

FIG. 3 illustrates an example of a function, f(t), defined by six pairs of (t, $\delta$t) values. Each t value has a corresponding $\delta$ value and a corresponding function value (after $\delta$). Prior to the first $\delta$ value at t=1, the function value is zero, or f(t)=0. Thus, the function value is zero from negative infinity to t=1. After the last $\delta$, the function holds the final value, thus f(t)=3 from t=7 to positive infinity. At any particular time, t, there is a function value just prior to t and a function value just after t. There may or may not be a $\delta$ at any given time point—the deltas may remain constant during some time increments.

Figure 4:
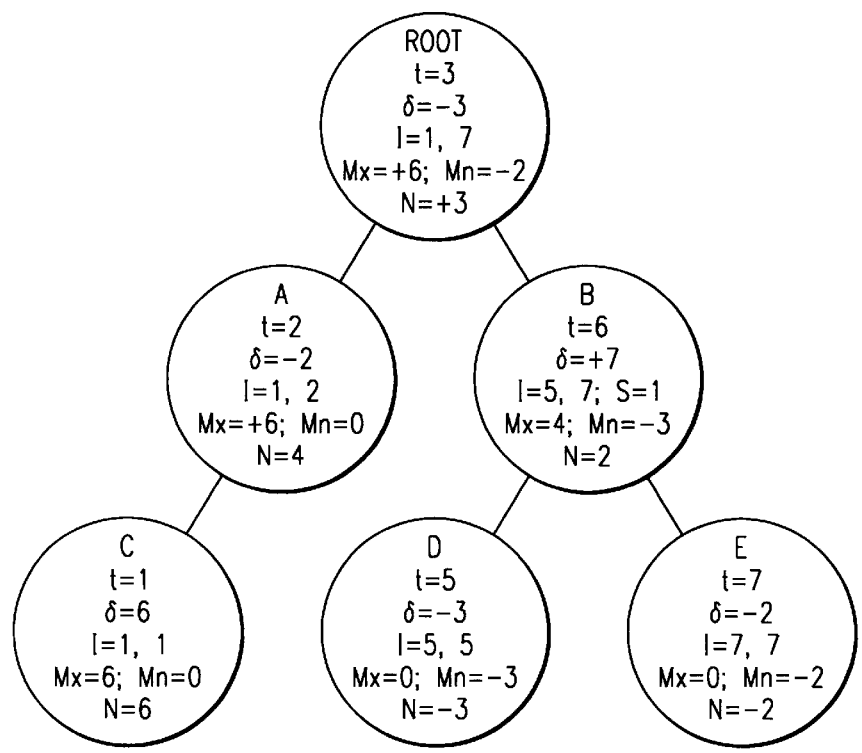
FIG. 4 illustrates a binary tree representing the function of FIG. 3.

FIG. 4 illustrates a binary tree built from the function of FIG. 3. Each node is illustrated with its stored node values, t(N), $\delta$(N), Net(N), Min(N), and Max(N). For purposes of explanation, a calculated time interval, I, and a calculated start value, S, associated with the node's subtree is also shown.

The function value f(t) any time can be determined from certain stored values (Net and $\delta$) and the calculated start value (S). To find the function value at time, t, the node, N, is found with the time closest to but not greater than t. As the tree is descended to the time in question, S(N) is calculated at each node. The function value at t is expressed as: f(t)=S(N)+Net(L)+$\delta$(N), where L is the left child of N. If N has no left child, then Net(L) is defined to be zero.

Referring to the example of FIGS. 3 and 4, to find the function value at t=6, the tree is traversed to node B, calculating S(N) for each visited node. Starting at the root node, by definition S(Root)=0. Descending to node B, because B is a right child of the root node, S(B)=S(Root)+Net(A)+$\delta$(Root) as explained above in connection with FIG. 2. By substitution, S(B)=0+4+(-3)=1. Expressed less formally, S(B) is the function value prior to the subtree under B, i.e., the function value just before node B at t=5. For the function value at node B, t=6, thus f(t=6)=S(B)+Net(D)+$\delta$(B)=1+(-3)+7=5.

For variations of this example, if the tree were to be descended from node B to node D, because D is a left child, then S(D)=S(B)=1. To find the function value at t=5.5, the tree would be traversed to node D. At D, f(t=5.5) =S(D)+ 0+δ(D)=1+(−3)=−2.

The Max and Min fields are used for "find" type queries, such as finding the earliest/latest time at which f(t) is greater/less than y, or such as finding the maximum/minimum value during a specified time interval. An enhancement of such queries, permits a limit to be specified for the time, such as a time greater than, equal to, or less than t.

In general, the Max and Min fields permit earliest/latest queries to handle<,>,≦, and ≧ predicates. The key to doing this efficiently is that at every node, there is a "bounding box" defined by the time interval covered by the node's subtree and by the minimum and maximum function values that occur within that node (relative to the start value for the node). If the start value of a node N is S(N), then somewhere within the time interval for the node, there is a maximum value of S(N)+Max(N) and a minimum value of S(N)+Min (N). (The maximum or minimum might be S(N) itself.) As the tree is traversed from the root toward the leaves, S(N) for each node is calculated as well as the minimum and maximum function values reached within that node's subtree.

The bounding box often guarantees whether a time satisfying the find query is or is not within a subtree. However, in some cases, the bounding box can provide only a "maybe". Using the example of FIGS. 3 and 4, a "maybe" situation would occur when the query is "find a time greater than t=4 when f(t)>2". At the root node, its bounding box indicates that the function value reaches 2 sometime between t=0 and t=7, but does not indicate whether this occurs before or after t>4. However, a feature of the invention is the likelihood that a node's bounding box will indicate either "yes" or "no" that the solution is in that node's subtree.

Referring to the example of FIGS. 3 and 4, a "find" query might ask for the earliest time after t=4 at which the function value is>2. The bounding box for the root node includes times from t=1 to t=7, and function values from a minimum of −2 to a maximum of +6. (If the query were for the earliest time at which the function value is >10, the query would end, because the solution is outside the bounding box.) Because t=4 is greater than t(Root)=3, the solution is in the right subtree. At node B, the bounding box includes times from t=5 to t=7. The start value for the subtree at B, S(B), is calculated to be 1, so the function values for the bounding box at B have a lower bound of −2 and an upper bound of 5. (S(N)+Min and Max, respectively). Somewhere within the bounding box there is a t>4 where the function value is greater than 2. The search continues in this fashion, working down the tree, checking the bounding boxes at each point.

Typically, both the Min and Max fields will be stored so that both "earliest" and "latest" find queries can be solved. However, the invention would be useful with only one of these queries available. In this case, as the tree is traversed, only one bound of the function values within the subtree would be calculated.

The above description is in terms of a step function, f(t), which is discontinuous at any time that has a delta. By convention, if a query requests a function value at the time of a delta, the value provided is that immediately after the delta. However, the value provided could be that immediately before the delta, with appropriate modifications to the query-solving algorithms described above.

Data Structure Operations and Efficiency

An "update" operation deals with the effect of a change in the delta of a node. First, the time of the changed delta is tested against the root node. If the changed delta is to the left (in the left sub-tree), then the descendent nodes to the right of the root node do not need to be changed. This is because the stored values for each node are local to each tree branch. As the only branch that was changed was the left one, the right branch and all the corresponding nodes remain unchanged. The same applies if the node being changed is located in the right sub-tree.

The root node itself will have its Net, Min, and Max values updated. Going down the tree, the visited nodes are marked until the node being changed is reached. These are the only nodes that need to be updated, because they correspond to time intervals containing the node being updated. This operation can be performed in time O(log n) in a height-balanced tree with n delta nodes.

An "Insert" operation is used to insert a new delta. For example, suppose a delta at time t with value δ(t) is to be inserted. The tree is traversed downwardly, looking for the leaf node under which the node must be inserted in order to preserve the time-ordering relation in the tree. The new node is inserted it as a leaf node under the previous leaf node. Because this new node is a leaf node, its Net, Min, and Max can be calculated. Then, the "update" operation is performed. This operation can be performed in time O(log n) in a height-balanced tree with n delta nodes.

A "Change Delta" operation is similar to the "insert" operation. The tree is traversed downwardly from the root node until arriving at the node to be changed. Its value is changed, and the "update" operation is performed. This operation is also performed in time O(log n) with n delta nodes inserted in a height-balanced tree.

The "Calculate Function Value" operation, explained by example in connection with FIGS. 3 and 4, returns the function value at a given time point. The tree is traversed to the node, N, immediately before the time in question. The function value is S(N)−Net(L)+δ(N), where L is the left child of N. The complexity is O(log n) with n nodes in a height-balanced tree.

The "Find Earliest" operation, explained by example in connection with FIGS. 3 and 4, returns the earliest time, t, when the function value is less, less or equal, greater, greater or equal than a specified value, y. At each node, its left child is visited first, then the right child, thus the nodes with earlier times are visited first. At each node, this operation makes use of the Max and Min values and the bounding box explained above. Because the bounding box sometimes provides a "maybe" rather than a certainty, both the left and right nodes must sometimes be searched. Nevertheless, the search complexity is O(log n) in a height-balanced tree with n nodes.

A "Find Latest" operation is similar to the "Find Earliest" operation, with the difference that right children are visited first, because the query is for the latest time point that satisfies the search criteria. The search complexity is the same.

"Find Maximum" and a "Find Minimum" operations find the maximum or minimum function value over a specified time interval. Like the other "Find" operations, these operations use the Max and Min fields at each node and can be performed in O(log n) time.

Other Embodiments

Although the present invention has been described in detail, it should be understood that various changes, substitutions, and alterations can be made hereto without departing from the spirit and scope of the invention as defined by the appended claims.

What is claimed is:

1. A method of storing values of a time-varying variable, comprising the steps of:
   representing the variable as a time-varying function having time values and function values;
   creating a balanced binary tree, each node of the tree associated with a change in value of the function;
   for each node, storing a time value, a delta value, a maximum subtree value, and a minimum subtree value, each subtree value representing a relative contribution from the subtree beginning with that node; and
   providing a bounding box function callable from any node and operable to use that node's subtree values to calculate one or more bounds of values of the function within the subtree.

2. The method of claim 1, wherein the function is a step function and the changes are constant delta values.

3. The method of claim 1, wherein said storing step is further performed by storing, for each node, a net subtree value representing the sum of deltas in the subtree associated with that node.

4. A method of solving find earliest/latest queries about values of a time-varying function, comprising the steps of:
   representing the function as a balanced binary tree, the tree having nodes that each represent a change in value of the variable, each node having an associated time value, delta value, subtree maximum value, and subtree minimum value;
   traversing the tree, at each node calculating function bounding values representing the maximum and minimum function values associated with the subtree and a start value representing the function value at the start of the time span associated with the subtree; and
   at each node, using the associated function bounding values and start value to determine if the solution is in the subtree of that node.

5. The method of claim 4, wherein the query specifies an upper bound on quantity, and the traversing step solves the query by finding an earliest time when the quantity satisfies that bound.

6. The method of claim 4, wherein the query specifies an upper bound on quantity, and the traversing step solves the query by finding a latest time when the quantity satisfies that bound.

7. The method of claim 4, wherein the query specifies a lower bound of quantity, and the traversing step solves the query by finding an earliest time when the quantity satisfies that bound.

8. The method of claim 4, wherein the query specifies a lower bound of quantity, and the traversing step solves the query by finding a latest time when the quantity satisfies that bound.

9. The method of claim 4, wherein the query specifies a lower bound on time and a lower bound on quantity, and the traversing step solves the query by determining the earliest time after the specified time bound when the quantity satisfies the specified quantity bound.

10. The method of claim 4, wherein the query specifies an upper bound on time and a lower bound on quantity, and the traversing step solves the query by determining the latest time before the specified time bound when the quantity satisfies the specified quantity bound.

11. The method of claim 4, wherein the query specifies a lower bound on time and an upper bound on quantity, and the traversing step solves the query by determining the earliest time after the specified time bound when the quantity satisfies the specified quantity bound.

12. The method of claim 4, wherein the query specifies an upper bound on time and an upper bound on quantity, and the traversing step solves the query by determining the latest time before the specified time bound when the quantity satisfies the specified quantity bound.

13. The method of claim 4, wherein the query specifies a time interval, and the traversing step solves the query by determining a maximum in the time interval.

14. The method of claim 4, wherein the query specifies a time interval, and the traversing step solves the query by determining a minimum in the time interval.

* * * * *